US012226840B2

(12) United States Patent
Matsubara et al.

(10) Patent No.: US 12,226,840 B2
(45) Date of Patent: Feb. 18, 2025

(54) ROTARY CUTTING TOOL CUTTING INSERT AND ROTARY CUTTING TOOL

(71) Applicant: Sumitomo Electric Hardmetal Corp., Itami (JP)

(72) Inventors: Kouki Matsubara, Itami (JP); Sachie Goto, Itami (JP); Kohei Ito, Itami (JP); Toya Nonen, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 482 days.

(21) Appl. No.: 17/433,606

(22) PCT Filed: Sep. 2, 2020

(86) PCT No.: PCT/JP2020/033207
§ 371 (c)(1),
(2) Date: Aug. 25, 2021

(87) PCT Pub. No.: WO2022/049659
PCT Pub. Date: Mar. 10, 2022

(65) Prior Publication Data
US 2022/0339718 A1    Oct. 27, 2022

(51) Int. Cl.
*B23C 5/10*    (2006.01)
*B23B 51/00*    (2006.01)

(52) U.S. Cl.
CPC ............... *B23C 5/10* (2013.01); *B23B 51/00* (2013.01); *B23C 2200/0438* (2013.01); *B23C 2200/203* (2013.01)

(58) Field of Classification Search
CPC .............. B23B 27/141; B23B 51/0008; B23B 2200/0447; B23B 2200/0452;
(Continued)

(56) References Cited

U.S. PATENT DOCUMENTS 4,373,839 A    2/1983   Negishi et al.
4,893,969 A *  1/1990   Hessman ............... B23C 5/205
                                                          407/115
(Continued)

FOREIGN PATENT DOCUMENTS

CA    2797022 A1    11/2011
CN    102548689 A    7/2012
(Continued)

OTHER PUBLICATIONS

P-2007007736-A Machine Translation (Year: 2023).*
JP-H06190612-A Machine Translation (Year: 2023).*

*Primary Examiner* — Nicole N Ramos
(74) *Attorney, Agent, or Firm* — XSENSUS LLP

(57) ABSTRACT

A straight line along the second line segment and a straight line along the fourth line segment form an acute angle. The straight line along the second line segment and the straight line along the third line segment form an obtuse angle. The straight line along the first line segment and the straight line along the fourth line segment form an obtuse angle. Each of the third curved portion and the fourth curved portion is larger in radius of curvature than the first curved portion and larger in radius of curvature than the second curved portion. In a direction perpendicular to the bottom surface, a distance between the top surface and the bottom surface is equal to a distance between the cutting edge and the bottom surface, or is shorter than the distance between the cutting edge and the bottom surface.

13 Claims, 19 Drawing Sheets

(58) Field of Classification Search
CPC .......... B23B 2200/20; B23B 2200/201; B23B 2200/3645; B23B 2200/3654; B23B 2251/44; B23C 5/202; B23C 2200/0433; B23C 2200/20; B23C 2200/201; B23C 2200/365; B23C 2200/366; B23C 2210/321

See application file for complete search history.

(56) References Cited

U.S. PATENT DOCUMENTS

| | | | |
|---|---|---|---|
| 5,052,863 A | 10/1991 | Satran | |
| 5,593,255 A | 1/1997 | Satran et al. | |
| 7,021,871 B2 | 4/2006 | Arvidsson et al. | |
| 2001/0051077 A1 | 12/2001 | Nagata et al. | |
| 2004/0037659 A1* | 2/2004 | Sung | B23C 5/202 407/116 |
| 2005/0084342 A1 | 4/2005 | Festeau et al. | |
| 2005/0147475 A1* | 7/2005 | Nagaya | B23C 5/109 407/42 |
| 2008/0219791 A1* | 9/2008 | Nasu | B23B 51/00 408/223 |
| 2009/0035074 A1* | 2/2009 | Craig | B23B 27/164 407/40 |
| 2010/0034606 A1 | 2/2010 | Nasu et al. | |
| 2011/0164936 A1* | 7/2011 | Okumura | B23B 27/143 408/1 BD |
| 2014/0248098 A1* | 9/2014 | Pacheri | B23B 27/143 407/113 |
| 2016/0263664 A1 | 9/2016 | Son et al. | |
| 2016/0339525 A1 | 11/2016 | Matsuda et al. | |
| 2020/0130072 A1 | 4/2020 | Ishi | |

FOREIGN PATENT DOCUMENTS

| | | | | |
|---|---|---|---|---|
| CN | 105682836 A | 6/2016 | | |
| CN | 105899316 A | 8/2016 | | |
| EP | 0422586 A2 | 4/1991 | | |
| EP | 2489453 A1 | 8/2012 | | |
| JP | 2-298414 A | 12/1990 | | |
| JP | H05-220605 A | 8/1993 | | |
| JP | H06190612 A | * 7/1994 | ............ | B23B 27/22 |
| JP | 8-66815 A | 3/1996 | | |
| JP | 11-138324 A | 5/1999 | | |
| JP | 2002-46010 A | 2/2002 | | |
| JP | 2007-007736 A | 1/2007 | | |
| JP | 2008-178967 A | 8/2008 | | |
| JP | 2017-189855 A | 10/2017 | | |

* cited by examiner

FIG.16

| | SAMPLE 1 | SAMPLE 2 | SAMPLE 3 | SAMPLE 4 | SAMPLE 5 | SAMPLE 6 | SAMPLE 7 |
|---|---|---|---|---|---|---|---|
| SCHEMATIC PLAN VIEW | | | | | | | |
| ACUTE ANGLE SIDE R1,R2(mm) | 0.6 | 0.6 | 0.6 | 0.6 | 0.6 | 0.6 | 0.6 |
| OBTUSE ANGLE SIDE R3,R4(mm) | 0.6 | 0.6 | 1.0 | 1.4 | 1.8 | 2.2 | 1.4 |
| CENTRAL EDGE SHARING RATE | 52.9% | 52.9% | 52.0% | 50.7% | 50.1% | 48.9% | 50.7% |
| BREAKER | HUMP SHAPE | FLAT SHAPE | FLAT SHAPE | FLAT SHAPE | FLAT SHAPE | FLAT SHAPE | RECESSED SHAPE |
| PURPOSE | ALREADY EXIST | CONFIRM EFFECT BY FLATNESS | CONFIRM EFFECT BY SHARING AMOUNT | CONFIRM EFFECT BY SHARING AMOUNT | CONFIRM EFFECT BY SHARING AMOUNT | CONFIRM EFFECT BY SHARING AMOUNT | CONFIRM EFFECT BY BREAKER |

FIG.17

| SHAPE OF SWARF | ENTIRE SHAPE | SAMPLE 1 | SAMPLE 2 | SAMPLE 3 | SAMPLE 4 | SAMPLE 5 | SAMPLE 6 | SAMPLE 7 |
|---|---|---|---|---|---|---|---|---|
| | ENLARGED SHAPE | | | | | | | | ered by the second throwaway tip is set to fall within a range of
ROTARY CUTTING TOOL CUTTING INSERT AND ROTARY CUTTING TOOL

CROSS-REFERENCE TO RELATED APPLICATION

The present application is based on PCT filing PCT/JP2020/033207, filed Sep. 2, 2020, the entire contents of which are incorporated herein by reference.

TECHNICAL FIELD

The present disclosure relates to a rotary cutting tool cutting insert (a cutting insert for a rotary cutting tool) and a rotary cutting tool.

BACKGROUND ART

Japanese Patent Laying-Open No. 2008-178967 (PTL 1) discloses a drill having a first throwaway tip and a second throwaway tip. The ratio between the cutting load amount of a central edge formed by the first throwaway tip and the cutting load amount of an outer peripheral edge formed by the second throwaway tip is set to fall within a range of A:B=52:48 to 55:45.

CITATION LIST

Patent Literature

PTL 1: Japanese Patent Laying-Open No. 2008-178967

SUMMARY OF INVENTION

A rotary cutting tool cutting insert according to the present disclosure includes a top surface, a bottom surface, and an outer peripheral surface. The bottom surface is located opposite to the top surface. The outer peripheral surface is contiguous to each of the top surface and the bottom surface. A ridgeline between the top surface and the outer peripheral surface forms a cutting edge. The cutting edge includes: a first line segment; a second line segment opposed to the first line segment; a third line segment inclined relative to each of the first line segment and the second line segment; a fourth line segment opposed to the third line segment; a first curved portion connecting the first line segment and the third line segment; a second curved portion connecting the second line segment and the fourth line segment; a third curved portion connecting the second line segment and the third line segment; and a fourth curved portion connecting the first line segment and the fourth line segment. A straight line along the first line segment and a straight line along the third line segment form an acute angle. A straight line along the second line segment and a straight line along the fourth line segment form an acute angle. A straight line along the second line segment and a straight line along the third line segment form an obtuse angle. A straight line along the first line segment and a straight line along the fourth line segment form an obtuse angle. Each of the third curved portion and the fourth curved portion is larger in radius of curvature than the first curved portion and larger in radius of curvature than the second curved portion. In a direction perpendicular to the bottom surface, a distance between the top surface and the bottom surface is equal to a distance between the cutting edge and the bottom surface, or is shorter than the distance between the cutting edge and the bottom surface.

BRIEF DESCRIPTION OF DRAWINGS

FIG. 16 is a diagram showing configurations of cutting inserts of respective samples 1 to 7.

FIG. 17 shows photographs of swarf from workpieces cut by the cutting inserts of respective samples 1 to 7.

DETAILED DESCRIPTION

Figure 1:
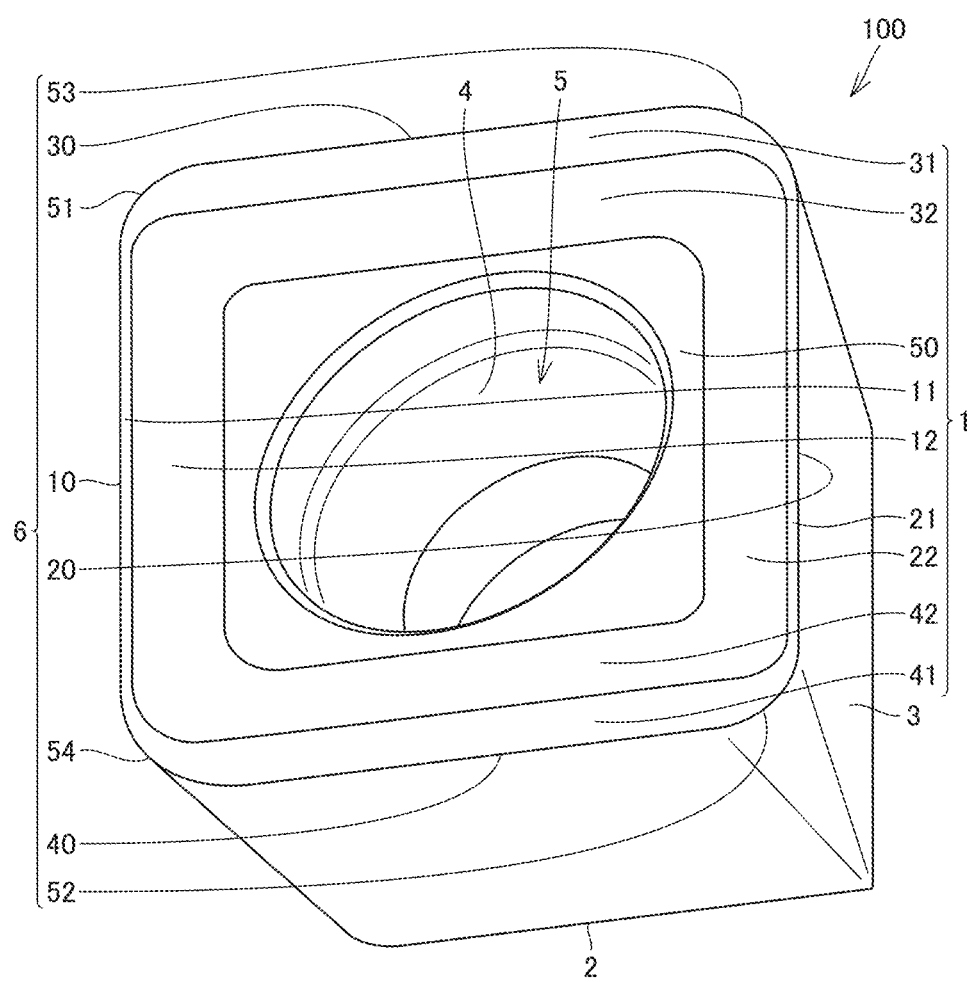
FIG. 1 is a schematic perspective view showing a configuration of a rotary cutting tool cutting insert according to the first embodiment.

Problem to be Solved by the Present Disclosure

The swarf discharge performance greatly differs depending on the workpiece. For example, swarf from carbon steel is relatively easily cut off. On the other hand, swarf from a highly viscous workpiece such as stainless steel is hard to be cut off as compared with carbon steel. When stainless steel is processed using a drill disclosed in PTL 1, it was difficult to effectively discharge swarf.

An object of the present disclosure is to provide a rotary cutting tool cutting insert and a rotary cutting tool that each can be improved in swarf discharge performance.

Advantageous Effect of the Present Disclosure

The present disclosure can provide a rotary cutting tool cutting insert and a rotary cutting tool that each can be improved in swarf discharge performance.

Description of Embodiments of the Present Disclosure

The embodiments of the present disclosure will be first listed below for explanation.

(1) A rotary cutting tool cutting insert 100 according to the present disclosure includes a top surface 1, a bottom surface 2, and an outer peripheral surface 3. Bottom surface 2 is located opposite to top surface 1. Outer peripheral surface 3 is contiguous to each of top surface 1 and bottom surface 2. A ridgeline between top surface 1 and outer peripheral surface 3 forms a cutting edge 6. Cutting edge 6 includes: a first line segment 10; a second line segment 20 opposed to first line segment 10; a third line segment 30 inclined relative to each of first line segment 10 and second line segment 20; a fourth line segment 40 opposed to third line segment 30; a first curved portion 51 connecting first line segment 10 and third line segment 30; a second curved portion 52 connecting second line segment 20 and fourth line segment 40; a third curved portion 53 connecting second line segment 20 and third line segment 30; and a fourth curved portion 54 connecting first line segment 10 and fourth line segment 40. A straight line along first line segment 10 and a straight line along third line segment 30 form an acute angle. A straight line along second line segment 20 and a straight line along fourth line segment 40 form an acute angle. The straight line along second line segment 20 and the straight line along third line segment 30 form an obtuse angle. The straight line along first line segment 10 and the straight line along fourth line segment 40 form an obtuse angle. Each of third curved portion 53 and fourth curved portion 54 is larger in radius of curvature than first curved portion 51 and larger in radius of curvature than second curved portion 52. In a direction perpendicular to bottom surface 2, a distance between top surface 1 and bottom surface 2 is equal to a distance between cutting edge 6 and bottom surface 2, or is shorter than the distance between cutting edge 6 and bottom surface 2.

(2) In rotary cutting tool cutting insert 100 according to the above-described (1), in the direction perpendicular to bottom surface 2, the distance between top surface 1 and bottom surface 2 may be equal to the distance between cutting edge 6 and bottom surface 2.

(3) In rotary cutting tool cutting insert 100 according to the above-described (1), top surface 1 may have a flat portion 50 spaced apart from cutting edge 6. In the direction perpendicular to bottom surface 2, flat portion 50 may be located between cutting edge 6 and bottom surface 2.

(4) In rotary cutting tool cutting insert 100 according to any one of the above-described (1) to (3), top surface 1 may include: a first land surface 11 contiguous to first line segment 10; a second land surface 21 contiguous to second line segment 20; a third land surface 31 contiguous to third line segment 30; and a fourth land surface 41 contiguous to fourth line segment 40. Each of a width of third land surface 31 in a direction perpendicular to third line segment 30 and a width of fourth land surface 41 in a direction perpendicular to fourth line segment 40 may be larger than a width of first land surface 11 in a direction perpendicular to first line segment 10 and larger than a width of second land surface 21 in a direction perpendicular to second line segment 20.

(5) In rotary cutting tool cutting insert 100 according to any one of the above-described (1) to (4), each of the radius of curvature of third curved portion 53 and the radius of curvature of fourth curved portion 54 may be twice or more and five times or less the radius of curvature of first curved portion 51, and may be twice or more and five times or less the radius of curvature of second curved portion 52.

(6) In rotary cutting tool cutting insert 100 according to the above-described (1), in the direction perpendicular to bottom surface 2, the distance between top surface 1 and bottom surface 2 may be equal to the distance between cutting edge 6 and bottom surface 2. Top surface 1 may include: a first land surface 11 contiguous to first line segment 10; a second land surface 21 contiguous to second line segment 20; a third land surface 31 contiguous to third line segment 30; and a fourth land surface 41 contiguous to fourth line segment 40. Each of a width of third land surface 31 in a direction perpendicular to third line segment 30 and a width of fourth land surface 41 in a direction perpendicular to fourth line segment 40 may be larger than a width of first land surface 11 in a direction perpendicular to first line segment 10 and larger than a width of second land surface 21 in a direction perpendicular to second line segment 20. Each of the radius of curvature of third curved portion 53 and the radius of curvature of fourth curved portion 54 may be twice or more and five times or less the radius of curvature of first curved portion 51, and may be twice or more and five times or less the radius of curvature of second curved portion 52.

(7) In rotary cutting tool cutting insert 100 according to the above-described (1), top surface 1 may have a flat portion 50 spaced apart from cutting edge 6. In the direction perpendicular to bottom surface 2, flat portion 50 may be located between cutting edge 6 and bottom surface 2. Top surface 1 may include: a first land surface 11 contiguous to first line segment 10; a second land surface 21 contiguous to second line segment 20; a third land surface 31 contiguous to third line segment 30; and a fourth land surface 41 contiguous to fourth line segment 40. Each of a width of third land surface 31 in a direction perpendicular to third line segment 30 and a width of fourth land surface 41 in a direction perpendicular to fourth line segment 40 may be larger than a width of first land surface 11 in a direction perpendicular to first line segment 10 and larger than a width of second land surface 21 in a direction perpendicular to second line segment 20. Each of the radius of curvature of third curved portion 53 and the radius of curvature of fourth curved portion 54 may be twice or more and five times or less the radius of curvature of first curved portion 51, and may be twice or more and five times or less the radius of curvature of second curved portion 52.

(8) A rotary cutting tool according to the present disclosure includes: rotary cutting tool cutting insert 100 according to any one of the above-described (1) to (7); and a main body portion that holds rotary cutting tool cutting insert 100.

Details of Embodiment of the Present Disclosure

Details of the embodiments of the present disclosure will be hereinafter described with reference to the accompanying drawings, in which the same or corresponding portions are denoted by the same reference characters, and the description thereof will not be repeated.

First Embodiment

First, the following describes a configuration of a rotary cutting tool cutting insert 100 according to the first embodiment.

FIG. 1 is a schematic perspective view showing a configuration of rotary cutting tool cutting insert 100 according to the first embodiment. As shown in FIG. 1, rotary cutting tool cutting insert 100 according to the first embodiment mainly includes a top surface 1, a bottom surface 2, an outer peripheral surface 3, and an inner peripheral surface 4. Bottom surface 2 is located opposite to top surface 1. Bottom surface 2 is a flat surface, for example. Outer peripheral surface 3 is contiguous to each of top surface 1 and bottom surface 2. A ridgeline between top surface 1 and outer peripheral surface 3 forms a cutting edge 6. Top surface 1 is a rake face, for example. Outer peripheral surface 3 is a flank face, for example. Inner peripheral surface 4 is contiguous to each of top surface 1 and bottom surface 2. Inner peripheral surface 4 defines a through hole 5. Through hole 5 opens at each of top surface 1 and bottom surface 2. Outer peripheral surface 3 surrounds inner peripheral surface 4.

Figure 2:
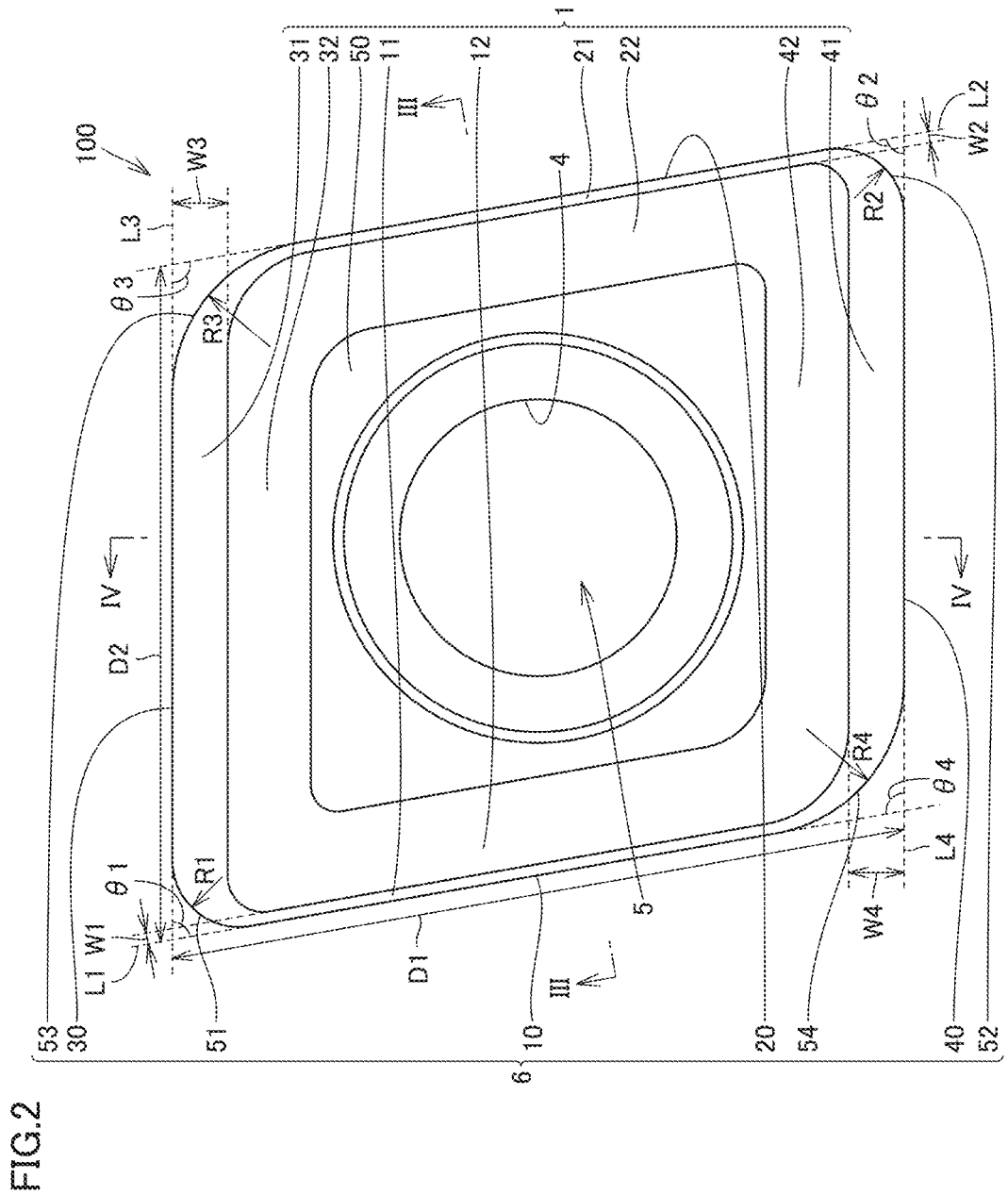
FIG. 2 is a schematic plan view showing a configuration of the rotary cutting tool cutting insert according to the first embodiment.

FIG. 2 is a schematic plan view showing a configuration of rotary cutting tool cutting insert 100 according to the first embodiment. As shown in FIG. 2, cutting edge 6 has a substantially parallelogram shape in a view seen in the direction perpendicular to bottom surface 2. Cutting edge 6 has a first line segment 10, a second line segment 20, a third line segment 30, a fourth line segment 40, a first curved portion 51, a second curved portion 52, a third curved portion 53, and a fourth curved portion 54. Second line segment 20 is opposed to first line segment 10. Second line segment 20 and first line segment 10 are substantially parallel to each other. Third line segment 30 is inclined relative to each of first line segment 10 and second line segment 20. Fourth line segment 40 is opposed to third line segment 30. Fourth line segment 40 is inclined relative to each of first line segment 10 and second line segment 20. Fourth line segment 40 and third line segment 30 are substantially parallel to each other. Each of first line segment 10, second line segment 20, third line segment 30, and fourth line segment 40 linearly extends. Each of first line segment 10 and second line segment 20 is a portion used as a central edge. Each of third line segment 30 and fourth line segment 40 is a portion used as an outer peripheral edge.

As shown in FIG. 2, an angle (a first angle $\theta 1$) formed between a straight line (a first straight line L1) along first line segment 10 and a straight line (a third straight line L3) along third line segment 30 is an acute angle. Similarly, an angle (a second angle $\theta 2$) formed between a straight line (a second straight line L2) along second line segment 20 and a straight line (a fourth straight line L4) along fourth line segment 40 is an acute angle. In other words, each of first angle $\theta 1$ and second angle $\theta 2$ is greater than 0° and less than 90°. First angle $\theta 1$ and second angle $\theta 2$ are substantially the same. Each of first angle $\theta 1$ and second angle $\theta 2$ is equal to or greater than 75° and equal to or less than 85°, for example.

As shown in FIG. 2, an angle (a third angle $\theta 3$) formed between the straight line (second straight line L2) along second line segment 20 and the straight line (third straight line L3) along third line segment 30 is an obtuse angle. Similarly, an angle (a fourth angle $\theta 4$) formed between the straight line (first straight line L1) along first line segment 10 and the straight line (fourth straight line L4) along fourth line segment 40 is an obtuse angle. In other words, each of third angle $\theta 3$ and fourth angle $\theta 4$ is greater than 90° and less than 180°. Third angle $\theta 3$ and fourth angle $\theta 4$ are substantially the same. Each of third angle $\theta 3$ and fourth angle $\theta 4$ is equal to or greater than 95° and equal to or less than 105°, for example.

As shown in FIG. 2, first curved portion 51 connects first line segment 10 and third line segment 30. Second curved portion 52 connects second line segment 20 and fourth line segment 40. Third curved portion 53 connects second line segment 20 and third line segment 30. Fourth curved portion 54 connects first line segment 10 and fourth line segment 40. Each of first curved portion 51, second curved portion 52, third curved portion 53, and fourth curved portion 54 has an arc shape. A radius of curvature (a first radius of curvature R1) of first curved portion 51 and a radius of curvature (a second radius of curvature R2) of second curved portion 52 are substantially the same. A radius of curvature (a third radius of curvature R3) of third curved portion 53 and a radius of curvature (a fourth radius of curvature R4) of fourth curved portion 54 are substantially the same.

Each of the radius of curvature (third radius of curvature R3) of third curved portion 53 and the radius of curvature (fourth radius of curvature R4) of fourth curved portion 54 is larger than the radius of curvature (first radius of curvature R1) of first curved portion 51 and larger than the radius of curvature (second radius of curvature R2) of second curved portion 52. In other words, third radius of curvature R3 is larger than each of first radius of curvature R1 and second radius of curvature R2. Fourth radius of curvature R4 is larger than each of first radius of curvature R1 and second radius of curvature R2.

Each of the radius of curvature (third radius of curvature R3) of third curved portion 53 and the radius of curvature (fourth radius of curvature R4) of fourth curved portion 54 may be twice or more and five times or less the radius of curvature (first radius of curvature R1) of first curved portion 51, and may be twice or more and five times or less the radius of curvature (second radius of curvature R2) of second curved portion 52. In other words, third radius of curvature R3 may be twice or more and five times or less each of first radius of curvature R1 and second radius of curvature R2. Fourth radius of curvature R4 may be twice or more and five times or less each of first radius of curvature R1 and second radius of curvature R2.

The lower limit of each of the radius of curvature of third curved portion 53 and the radius of curvature of fourth curved portion 54 is not particularly limited but, for example, may be 2.5 times or more or may be three times or more each of the radius of curvature of first curved portion 51 and the radius of curvature of second curved portion 52. The upper limit of each of the radius of curvature of third curved portion 53 and the radius of curvature of fourth curved portion 54 is not particularly limited but, for example, may be 4.5 times or less or may be four times or less each of the radius of curvature of first curved portion 51 and the radius of curvature of second curved portion 52.

As shown in FIG. 2, top surface 1 may include a first land surface 11, a second land surface 21, a third land surface 31, a fourth land surface 41, a first inclined surface 12, a second inclined surface 22, a third inclined surface 32, a fourth inclined surface 42, and a flat portion 50. First land surface 11 is contiguous to first line segment 10. Second land surface 21 is contiguous to second line segment 20. Third land surface 31 is contiguous to third line segment 30. Fourth land surface 41 is contiguous to fourth line segment 40. Flat portion 50 is contiguous to inner peripheral surface 4. Flat portion 50 is a boss surface. Flat portion 50 is spaced apart from cutting edge 6. As shown in FIG. 2, flat portion 50 surrounds through hole 5 in a view seen in the direction perpendicular to bottom surface 2. Cutting edge 6 surrounds flat portion 50 in a view seen in the direction perpendicular to bottom surface 2.

First inclined surface 12 is located between first land surface 11 and flat portion 50. First inclined surface 12 is contiguous to each of first land surface 11 and flat portion 50. Second inclined surface 22 is located between second land surface 21 and flat portion 50. Second inclined surface 22 is contiguous to each of second land surface 21 and flat portion 50. Third inclined surface 32 is located between third land surface 31 and flat portion 50. Third inclined surface 32 is contiguous to each of third land surface 31 and flat portion 50. Fourth inclined surface 42 is located between fourth land surface 41 and flat portion 50. Fourth inclined surface 42 is contiguous to each of fourth land surface 41 and flat portion 50.

As shown in FIG. 2, each of a width (a third land width W3) of third land surface 31 in the direction perpendicular to third line segment 30 and a width (a fourth land width W4) of fourth land surface 41 in the direction perpendicular to fourth line segment 40 may be larger than a width (a first land width W1) of first land surface 11 in the direction perpendicular to first line segment 10 and may be larger than a width (a second land width W2) of second land surface 21 in the direction perpendicular to second line segment 20. In other words, third land width W3 is larger than each of first land width W1 and second land width W2. Fourth land width W4 is larger than each of first land width W1 and second land width W2. First land width W1 and second land width W2 are substantially the same. Third land width W3 and fourth land width W4 are substantially the same.

The lower limit of each of third land width W3 and fourth land width W4 is not particularly limited but, for example, may be twice or more or may be three times or more each of first land width W1 and second land width W2. The upper limit of each of third land width W3 and fourth land width W4 is not particularly limited but, for example, may be ten times or less or may be eight times or less each of first land width W1 and second land width W2.

As shown in FIG. 2, a distance (a first distance D1) between third line segment 30 and fourth line segment 40 in the direction parallel to first line segment 10 may be larger than a distance (a second distance D2) between first line segment 10 and second line segment 20 in the direction parallel to third line segment 30. The lower limit of first distance D1 is not particularly limited but, for example, may be 1.05 times or more or may be 1.08 times or more the second distance D2. The upper limit of first distance D1 is not particularly limited but, for example, may be 1.5 times or less or may be 1.3 times or less the second distance D2.

Figure 3:
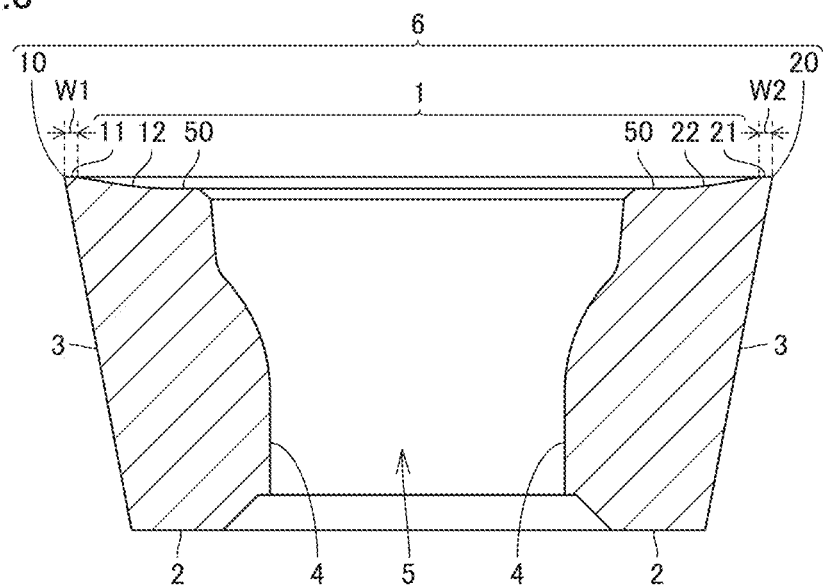
FIG. 3 is a schematic cross-sectional view taken along a line III-III in FIG. 2.

FIG. 3 is a schematic cross-sectional view taken along a line III-III in FIG. 2. The cross section shown in FIG. 3 is perpendicular to first line segment 10 and perpendicular to bottom surface 2. In the direction perpendicular to bottom surface 2, the distance between bottom surface 2 and each of first land surface 11 and second land surface 21 is equal to the distance between cutting edge 6 and bottom surface 2. In a different point of view, each of first land surface 11 and second land surface 21 is located on an imaginary plane including first line segment 10 and second line segment 20. Each of first land surface 11 and second land surface 21 is parallel to bottom surface 2, for example. Flat portion 50 is parallel to bottom surface 2, for example. Each of first land surface 11 and second land surface 21 is parallel to flat portion 50, for example.

In the direction perpendicular to bottom surface 2, first inclined surface 12 is located between first land surface 11 and flat portion 50. First inclined surface 12 is inclined relative to each of first land surface 11 and flat portion 50. First inclined surface 12 is inclined toward the bottom surface relative to first land surface 11. In the direction perpendicular to bottom surface 2, second inclined surface 22 is located between second land surface 21 and flat portion 50. Second inclined surface 22 is inclined relative to each of second land surface 21 and flat portion 50. Second inclined surface 22 is inclined toward the bottom surface relative to second land surface 21.

In the direction perpendicular to bottom surface 2, flat portion 50 is located between cutting edge 6 and bottom surface 2. Specifically, in the direction perpendicular to bottom surface 2, flat portion 50 is located between bottom surface 2 and each of first land surface 11 and second land surface 21. More specifically, in the direction perpendicular to bottom surface 2, flat portion 50 is located between inner peripheral surface 4 and each of first inclined surface 12 and second inclined surface 22.

Figure 4:
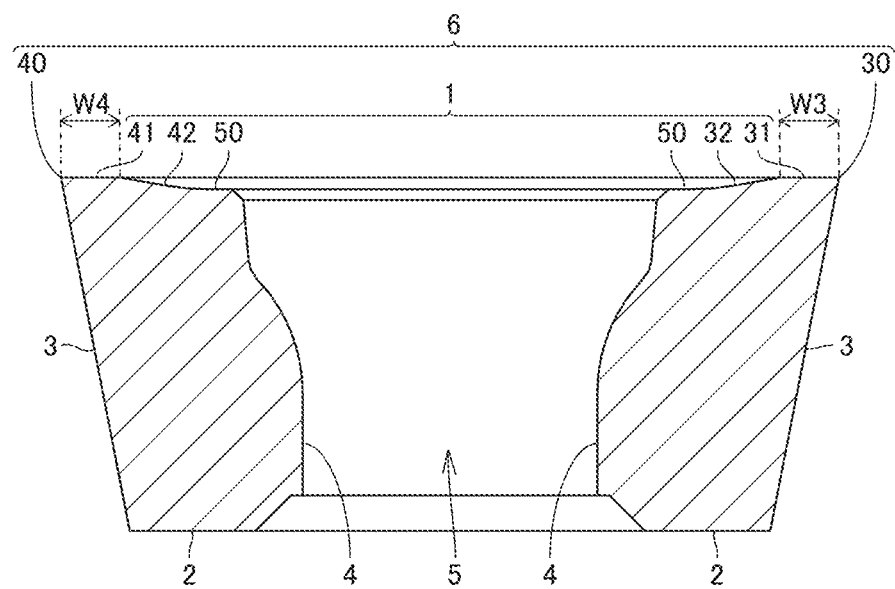
FIG. 4 is a schematic cross-sectional view taken along a line IV-IV in FIG. 2.

FIG. 4 is a schematic cross-sectional view taken along a line Iv-Iv in FIG. 2. The cross section shown in FIG. 4 is perpendicular to third line segment 30 and perpendicular to bottom surface 2. In the direction perpendicular to bottom surface 2, the distance between bottom surface 2 and each of third land surface 31 and fourth land surface 41 is equal to the distance between cutting edge 6 and bottom surface 2. In a different point of view, each of third land surface 31 and fourth land surface 41 is located on an imaginary plane including third line segment 30 and fourth line segment 40. Each of third land surface 31 and fourth land surface 41 is parallel to bottom surface 2, for example. Each of third land surface 31 and fourth land surface 41 is parallel to flat portion 50, for example.

In the direction perpendicular to bottom surface 2, third inclined surface 32 is located between third land surface 31 and flat portion 50. Third inclined surface 32 is inclined relative to each of third land surface 31 and flat portion 50. Third inclined surface 32 is inclined toward the bottom surface relative to third land surface 31. In the direction perpendicular to bottom surface 2, fourth inclined surface 42 is located between fourth land surface 41 and flat portion 50. Fourth inclined surface 42 is inclined relative to each of fourth land surface 41 and flat portion 50. Fourth inclined surface 42 is inclined toward the bottom surface relative to fourth land surface 41.

In the direction perpendicular to bottom surface 2, flat portion 50 is located between bottom surface 2 and each of third land surface 31 and fourth land surface 41. More specifically, in the direction perpendicular to bottom surface 2, flat portion 50 is located between inner peripheral surface 4 and each of third inclined surface 32 and fourth inclined surface 42. As shown in FIG. 4, the distance between the opposed surfaces of outer peripheral surface 3 in the direction parallel to bottom surface 2 may decrease monotonically from top surface 1 toward bottom surface 2.

As shown in FIGS. 3 and 4, in the direction perpendicular to bottom surface 2, the distance between top surface 1 and bottom surface 2 is equal to the distance between cutting edge 6 and bottom surface 2, or the distance between top surface 1 and bottom surface 2 is shorter than the distance between cutting edge 6 and bottom surface 2. In a different point of view, top surface 1 is not located above cutting edge 6 in the direction perpendicular to bottom surface 2. In a further different point of view, top surface 1 does not have a hump-shaped curved surface portion (a breaker) located above cutting edge 6. It is to be noted that the direction from bottom surface 2 toward top surface 1 corresponds to an upward direction.

Second Embodiment

Then, the configuration of a rotary cutting tool cutting insert 100 according to the second embodiment will be hereinafter described. Rotary cutting tool cutting insert 100 according to the second embodiment has the same configuration as that of rotary cutting tool cutting insert 100 according to the first embodiment mainly except that the distance between top surface 1 and bottom surface 2 is equal to the distance between cutting edge 6 and bottom surface 2. The following mainly describes the configuration different from that of rotary cutting tool cutting insert 100 according to the first embodiment.

Figure 5:
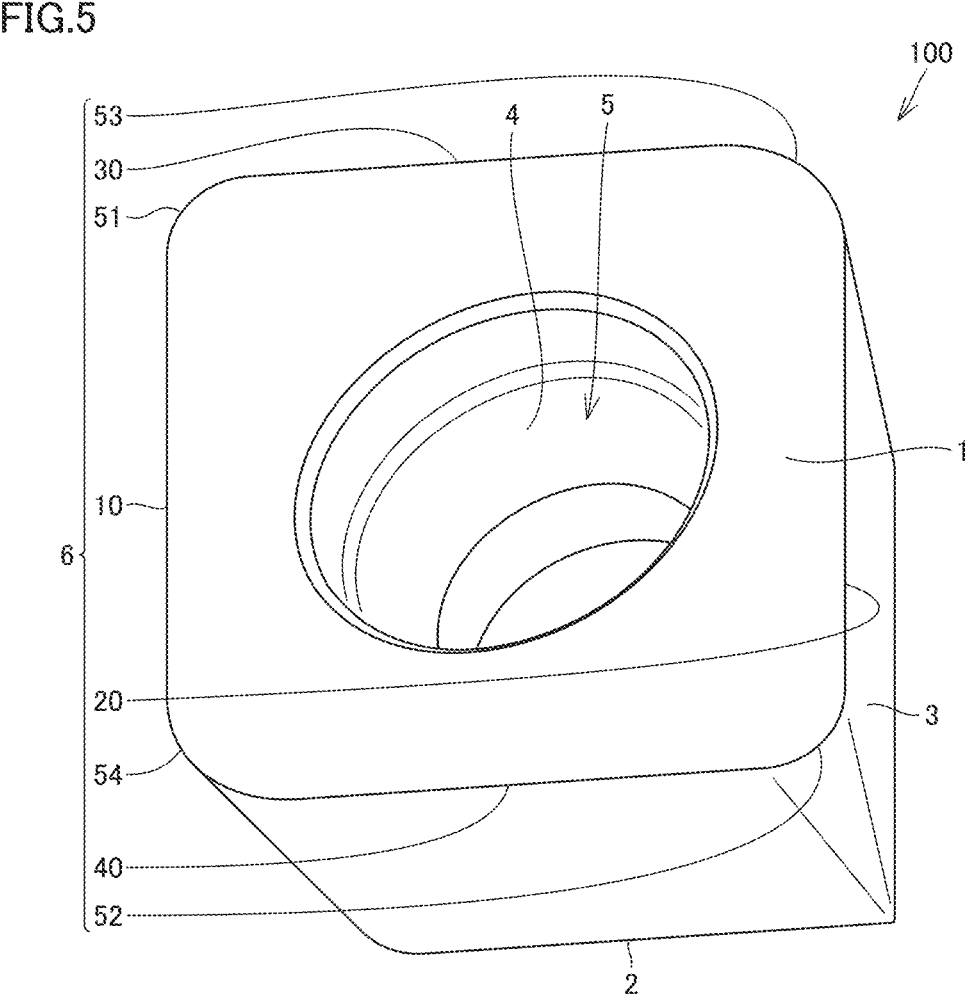
FIG. 5 is a schematic perspective view showing a configuration of a rotary cutting tool cutting insert according to the second embodiment.

FIG. 5 is a schematic perspective view showing a configuration of a rotary cutting tool cutting insert 100 according to the second embodiment. As shown in FIG. 5, top surface 1 of rotary cutting tool cutting insert 100 according to the second embodiment is a flat surface.

Figure 6:
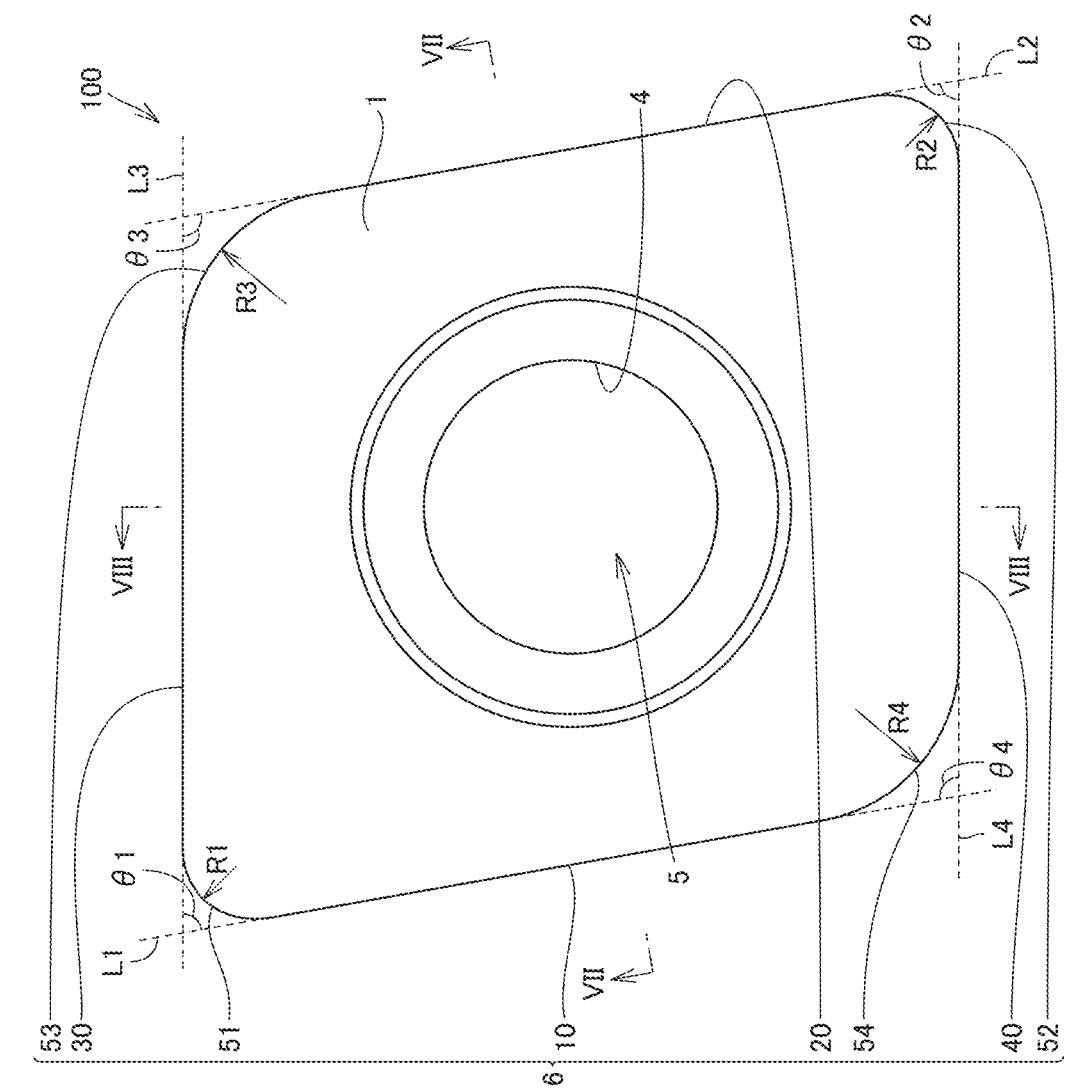
FIG. 6 is a schematic plan view showing a configuration of the rotary cutting tool cutting insert according to the second embodiment.

FIG. 6 is a schematic plan view showing the configuration of rotary cutting tool cutting insert 100 according to the second embodiment. As shown in FIG. 6, top surface 1 has a substantially parallelogram shape in a view seen in the direction perpendicular to bottom surface 2. Top surface 1 surrounds through hole 5. Top surface 1 is surrounded by first line segment 10, second line segment 20, third line segment 30, fourth line segment 40, first curved portion 51, second curved portion 52, third curved portion 53, and fourth curved portion 54.

Figure 7:
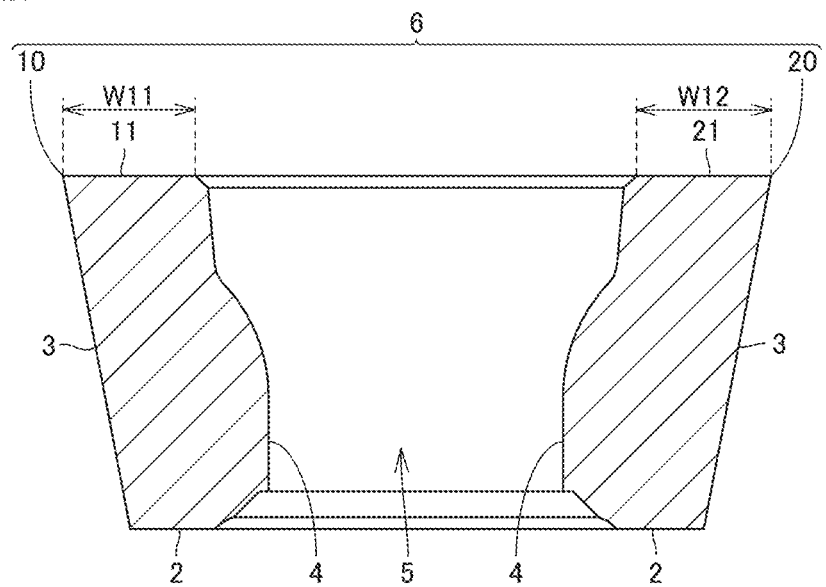
FIG. 7 is a schematic cross-sectional view taken along a line VII-VII in FIG. 6.

FIG. 7 is a schematic cross-sectional view taken along a line VII-VII in FIG. 6. The cross section shown in FIG. 7 is perpendicular to first line segment 10 and also perpendicular to bottom surface 2. In the direction perpendicular to bottom surface 2, the distance between top surface 1 and bottom surface 2 is equal to the distance between cutting edge 6 and bottom surface 2. In a different point of view, top surface 1 is located on an imaginary plane including first line segment 10 and second line segment 20. Top surface 1 is parallel to bottom surface 2, for example.

Figure 8:
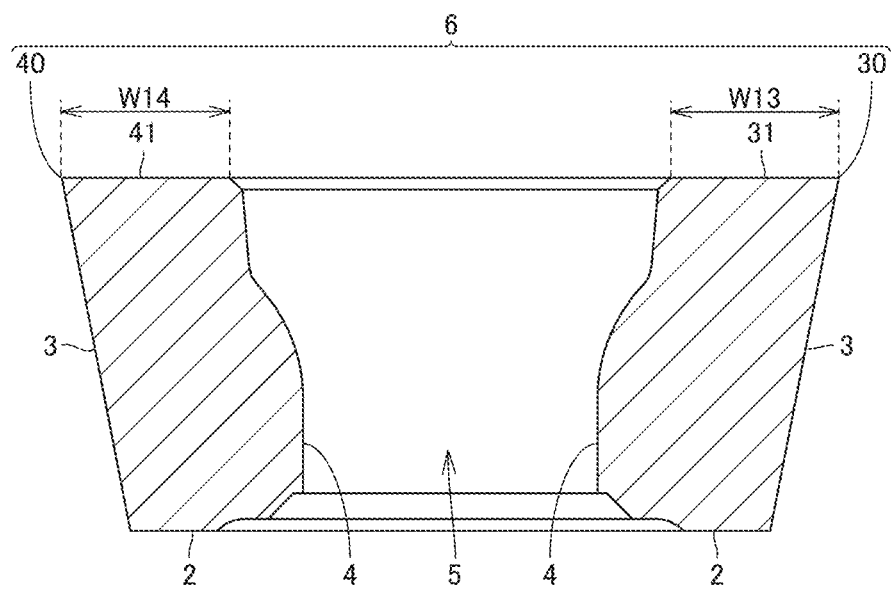
FIG. 8 is a schematic cross-sectional view taken along a line VIII-VIII in FIG. 6.

FIG. 8 is a schematic cross-sectional view taken along a line VIII-VIII in FIG. 6. The cross section shown in FIG. 8 is perpendicular to third line segment 30 and also perpendicular to bottom surface 2. In the direction perpendicular to bottom surface 2, top surface 1 is located on an imaginary plane including third line segment 30 and fourth line segment 40.

As shown in FIGS. 7 and 8, each of the width (a third land width W13) of third land surface 31 in the direction perpendicular to third line segment 30 and the width (a fourth land width W14) of fourth land surface 41 in the direction perpendicular to fourth line segment 40 may be larger than the width (a first land width W11) of first land surface 11 in the direction perpendicular to first line segment 10 and may be larger than the width (a second land width W12) of second land surface 21 in the direction perpendicular to second line segment 20. In other words, third land width W13 is larger than each of first land width W11 and second land width W12. Fourth land width W14 is larger than each of first land width W11 and second land width W12. First land width W11 and second land width W12 are substantially the same. Third land width W13 and fourth land width W14 are substantially the same.

Third Embodiment

The following describes the configuration of a rotary cutting tool according to the third embodiment.

Figure 9:
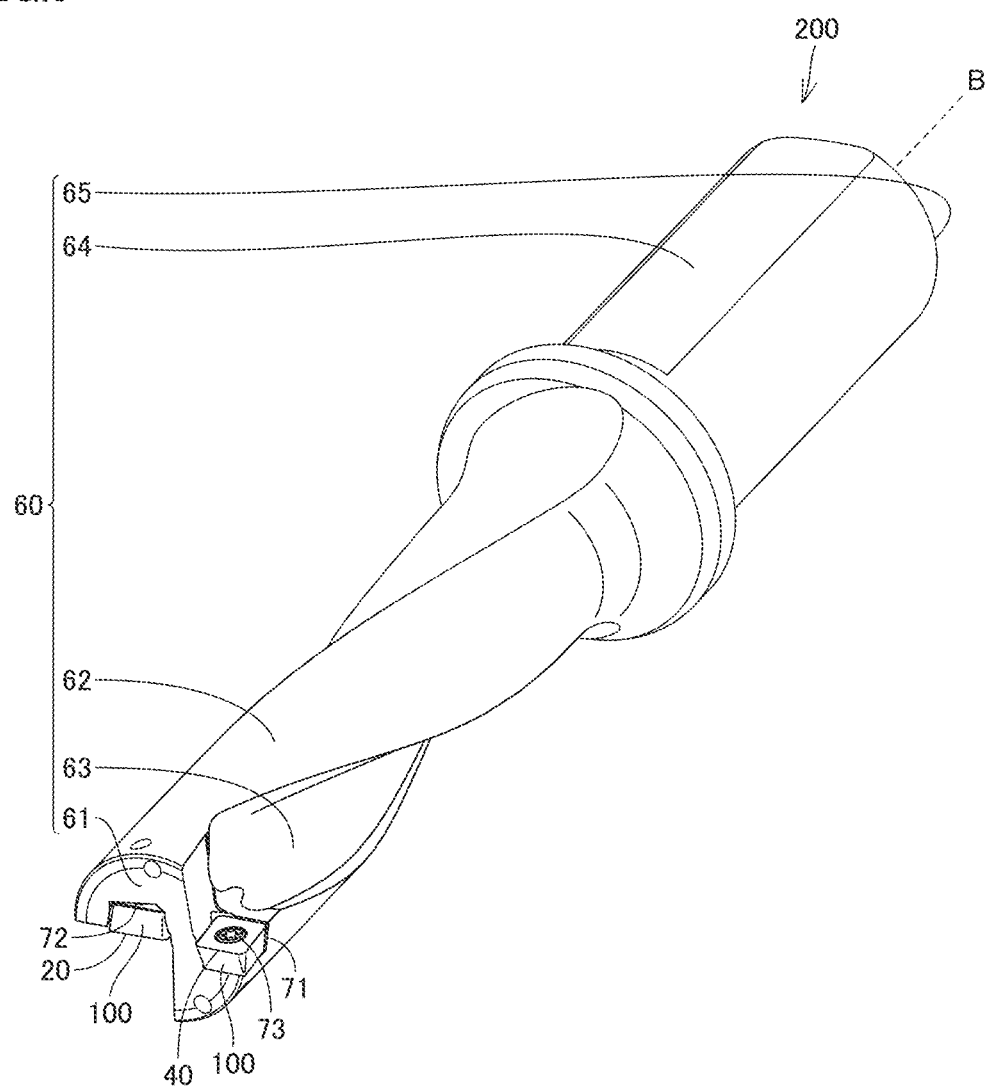
FIG. 9 is a schematic perspective view showing a configuration of a rotary cutting tool according to the third embodiment.

FIG. 9 is a schematic perspective view showing a configuration of the rotary cutting tool according to the third embodiment. As shown in FIG. 9, a rotary cutting tool 200 according to the third embodiment includes a main body portion 60 and a rotary cutting tool cutting insert 100. Rotary cutting tool 200 rotates about a rotation axis B. Main body portion 60 holds rotary cutting tool cutting insert 100. Rotary cutting tool cutting insert 100 is, for example, cutting insert 100 according to the first embodiment or the second embodiment.

Main body portion 60 has a front end surface 61, a rear end surface 65, an outer peripheral side surface 62, and a fitting portion 64. Front end surface 61 is a portion facing a workpiece. Rear end surface 65 is located on the opposite side of front end surface 61. Fitting portion 64 is contiguous to rear end surface 65. Fitting portion 64 is attached to a machine tool.

Main body portion 60 is provided with an outer peripheral-side cutting insert placement groove 71, a central-side cutting insert placement groove 72, and a swarf discharge groove 63. Outer peripheral-side cutting insert placement groove 71 is contiguous to each of outer peripheral-side surface 62 and front end surface 61. Central-side cutting insert placement groove 72 is contiguous to front end surface 61 and spaced apart from outer peripheral side surface 62. Swarf discharge groove 63 has a spiral shape. Swarf discharge groove 63 is provided around rotation axis B.

In rotary cutting tool 200, two cutting inserts 100 are attached to one main body portion 60. Specifically, one cutting insert 100 is attached to outer peripheral-side cutting insert placement groove 71 while the other cutting insert 100 is attached to central-side cutting insert placement groove 72. In outer peripheral-side cutting insert placement groove 71, cutting insert 100 is disposed such that fourth line segment 40 (the outer peripheral edge) is located axially forward. In central-side cutting insert placement groove 72, cutting insert 100 is disposed such that second line segment 20 (the central edge) is located axially forward. An attachment screw 73 is disposed in through hole 5 of cutting insert 100. Cutting insert 100 is attached to main body portion 60 with attachment screw 73. Bottom surface 2 of cutting insert 100 comes into contact with main body portion 60.

Figure 10:
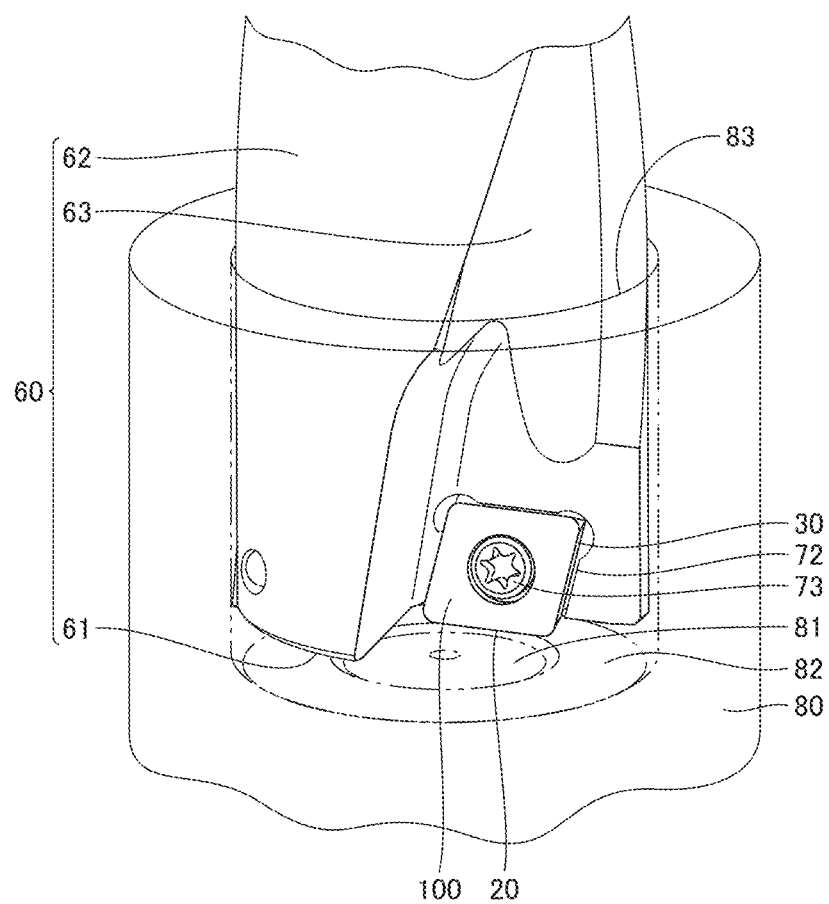
FIG. 10 is a schematic perspective view showing the state where a workpiece is processed using a rotary cutting tool.

FIG. 10 is a schematic perspective view showing the state where a workpiece is processed using rotary cutting tool 200. As shown in FIG. 10, rotary cutting tool 200 is used to provide a hole 83 in a workpiece 80. The bottom surface of hole 83 has a central edge cut area 81 and a peripheral edge cut area 82. Central edge cut area 81 is surrounded by outer peripheral edge cut area 82. Central edge cut area 81 is an area cut by the central edge of cutting insert 100 provided in central-side cutting insert placement groove 72. Outer peripheral edge cut area 82 is an area cut by the outer peripheral edge of cutting insert 100 provided in outer peripheral-side cutting insert placement groove 71.

Figure 11:
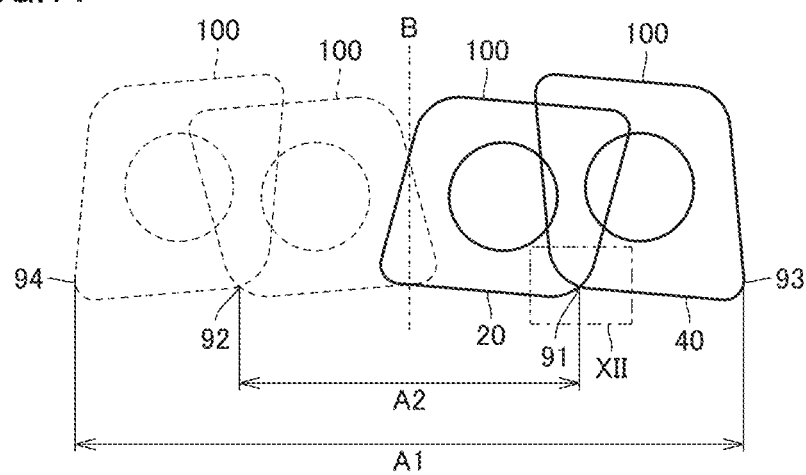
FIG. 11 is a schematic view showing a trajectory of a cutting insert provided in a central-side cutting insert placement groove and a trajectory of a cutting insert provided in an outer peripheral-side cutting insert placement groove.

FIG. 11 is a schematic view showing a trajectory of cutting insert 100 provided in central-side cutting insert placement groove 72 and a trajectory of cutting insert 100 provided in outer peripheral-side cutting insert placement groove 71. As shown in FIG. 11, when workpiece 80 is processed with rotary cutting tool 200, each of the trajectory of cutting insert 100 provided in central-side cutting insert placement groove 72 and the trajectory of cutting insert 100 provided in outer peripheral-side cutting insert placement groove 71 are symmetric with respect to rotation axis B. As shown in FIG. 11, in a view seen in the direction perpendicular to rotation axis B, the trajectory of cutting edge 6 of cutting insert 100 provided in central-side cutting insert placement groove 72 intersects with the trajectory of cutting edge 6 of cutting insert 100 provided in outer peripheral-side cutting insert placement groove 71.

As shown in FIG. 11, on the right side (on one side) of rotation axis B in a view seen in the direction perpendicular to rotation axis B, the trajectory of cutting edge 6 (the central edge) of cutting insert 100 provided in central-side cutting insert placement groove 72 and the trajectory of cutting edge 6 (the outer peripheral edge) of cutting insert 100 provided in outer peripheral-side cutting insert placement groove 71 intersect with each other at a first intersection point 91. On the left side (on the other side) of rotation axis B in a view seen in the direction perpendicular to rotation axis B, the trajectory of cutting edge 6 (the central edge) of cutting insert 100 provided in central-side cutting insert placement groove 72 and the trajectory of cutting edge 6 (the outer peripheral edge) of cutting insert 100 provided in outer peripheral-side cutting insert placement groove 71 intersect with each other at a second intersection point 92. The distance between first intersection point 91 and second intersection point 92 in the radial direction perpendicular to rotation axis B corresponds to a central edge sharing amount A2.

As shown in FIG. 11, on the right side (on one side) of rotation axis B in a view seen in the direction perpendicular to rotation axis B, a first outer peripheral point 93 is located on the outermost periphery of the trajectory of cutting edge 6 (the outer peripheral edge) of cutting insert 100 provided in outer peripheral-side cutting insert placement groove 71. On the left side (on the other side) of rotation axis B in a view seen in the direction perpendicular to rotation axis B, a second outer peripheral point 94 is located on the outermost periphery of the trajectory of cutting edge 6 (the outer peripheral edge) of cutting insert 100 provided in outer peripheral-side cutting insert placement groove 71. The distance between first outer peripheral point 93 and second outer peripheral point 94 in the radial direction perpendicular to rotation axis B is a tool diameter A1. Tool diameter A1 corresponds to the diameter of hole 83 provided in the workpiece. The value obtained by subtracting central edge sharing amount A2 from tool diameter A1 is an outer peripheral edge sharing amount.

Figure 12:
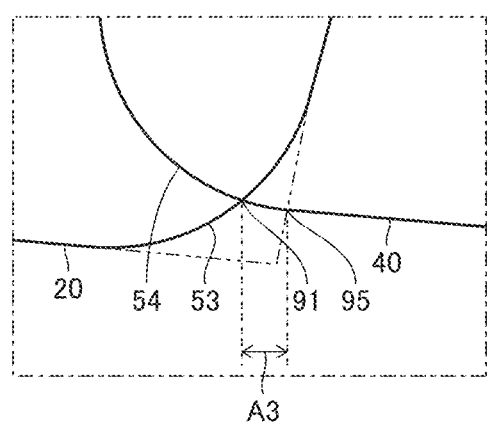
FIG. 12 is a schematic view showing a region XII in FIG. 11 in an enlarged manner.

FIG. 12 is a schematic view showing a region XII in FIG. 11 in an enlarged manner. In FIG. 12, the shape shown by a long dashed double-short dashed line indicates an imaginary corner portion of cutting edge 6 appearing when the radius of curvature of third curved portion 53 is substantially zero. In this case, first intersection point 91 is located at an imaginary intersection point 95. As shown in FIG. 12, as third curved portion 53 has a relatively large radius of curvature, first intersection point 91 shifts by a distance A3 toward the center. As a result, central edge sharing amount A2 can be reduced. The centrifugal force applied to the swarf cut by the central edge is smaller than the centrifugal force applied to the swarf cut by the outer peripheral edge. Thus, the swarf cut by the central edge is harder to be cut off than the swarf cut by the outer peripheral edge. As shown in FIG. 12, each of third curved portion 53 and fourth curved portion 54 has a relatively large radius of curvature, so that central edge sharing amount A2 is reduced to thereby adjust the cutting balance.

The value obtained by dividing central edge sharing amount A2 by tool diameter A1 is a central edge sharing rate. The central edge sharing rate is 48% or more and 53% or less, for example. The upper limit of the central edge sharing rate is not particularly limited but may be 52.5% or less, or may be 52% or less, for example. The lower limit of the central edge sharing rate is not particularly limited but may be 48.5% or more, or may be 49% or more, for example.

Then, the following describes the functions and effects of rotary cutting tool cutting insert 100 and rotary cutting tool 200 according to the above-described embodiments.

Figure 13:
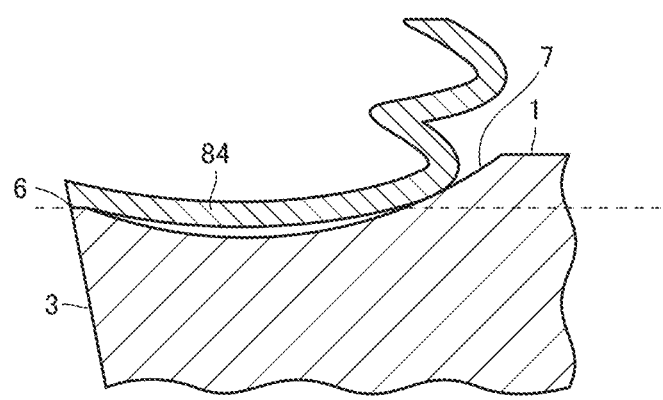
FIG. 13 is a schematic cross-sectional view showing a flow of swarf at the time when a workpiece is cut using a conventional cutting insert.

FIG. 13 is a schematic cross-sectional view showing a flow of swarf 84 at the time when workpiece 80 is cut using a conventional cutting insert 100. As shown in FIG. 13, conventional cutting insert 100 is provided with a hump-shaped breaker 7 located higher than cutting edge 6. After passing over the rake surface, swarf 84 of workpiece 80 cut by cutting edge 6 is then collapsed by breaker 7. For example, when highly viscous workpiece 80 such as stainless steel is cut, swarf 84 is collapsed without being cut off by a breaker. As a result, swarf 84 cannot be effectively discharged.

Figure 14:
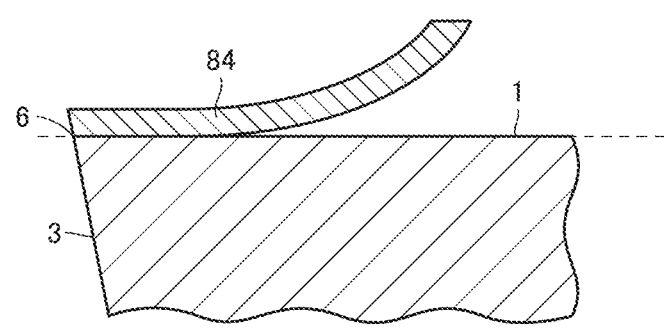
FIG. 14 is a schematic cross-sectional view showing a flow of swarf at the time when a workpiece is cut using a cutting insert in the second embodiment.

FIG. 14 is a schematic cross-sectional view showing a flow of swarf 84 at the time when workpiece 80 is cut using a cutting insert 100 in the second embodiment. As shown in FIG. 14, top surface 1 of cutting insert 100 in the second embodiment is located at the same height as cutting edge 6. Therefore, even when highly viscous workpiece 80 such as stainless steel is cut, swarf 84 of workpiece 80 cut by cutting edge 6 smoothly flows over top surface 1. Thereby, a collapse of swarf 84 can be suppressed. As a result, swarf 84 can be effectively discharged. In other words, the inventors switched the conventional concept of cutting off swarf 84 to a concept of causing swarf 84 to smoothly flow to be thereafter made roundish in swarf discharge groove 63 of main body portion 60 and then discharged. This allowed enhanced discharge performance for swarf 84.

Figure 15:
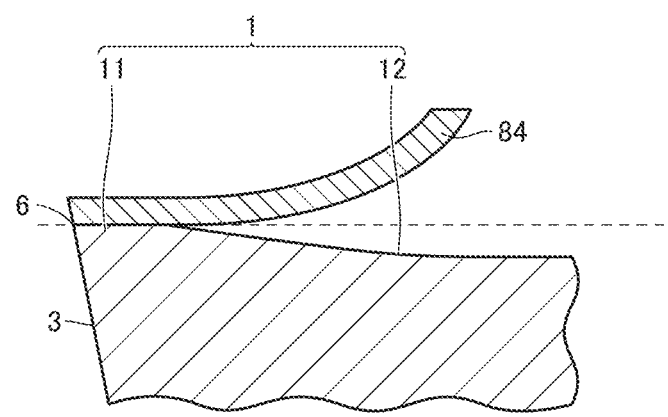
FIG. 15 is a schematic cross-sectional view showing a flow of swarf at the time when a workpiece is cut using a cutting insert in the first embodiment.

FIG. 15 is a schematic cross-sectional view showing a flow of swarf 84 at the time when workpiece 80 is cut using a cutting insert 100 in the first embodiment. As shown in FIG. 15, top surface 1 of cutting insert 100 in the first embodiment is located at the same height as cutting edge 6 or located closer to the bottom surface than cutting edge 6. Thus, even when highly viscous workpiece 80 such as stainless steel is cut, swarf 84 of workpiece 80 cut by cutting edge 6 smoothly flows over top surface 1. Thereby, a collapse of swarf 84 can be suppressed. Further, top surface 1 has a first land surface 11 and a first inclined surface 12 that is contiguous to first land surface 11 and inclined toward the bottom surface relative to first land surface 11. Thus, the area of contact (area of scratching) between swarf 84 and top surface 1 can be reduced as compared with cutting insert 100 in the second embodiment. Thereby, the cutting resistance can be reduced. As a result, swarf 84 can be more effectively discharged.

Specifically, according to rotary cutting tool cutting insert 100 in the above-described embodiment, in the direction perpendicular to bottom surface 2, the distance between top surface 1 and bottom surface 2 is equal to the distance between cutting edge 6 and bottom surface 2 or the distance between top surface 1 and bottom surface 2 is shorter than the distance between cutting edge 6 and bottom surface 2. Thus, even when highly viscous workpiece 80 such as stainless steel is cut, swarf 84 of workpiece 80 cut by cutting edge 6 smoothly flows over top surface 1. Thereby, a collapse of swarf 84 can be suppressed. As a result, the swarf discharge performance can be improved.

Each of the radius of curvature of third curved portion 53 and the radius of curvature of fourth curved portion 54 is larger than the radius of curvature of first curved portion 51 and larger than the radius of curvature of second curved portion 52. Thus, when the diameter of rotary cutting tool 200 is changed, central edge sharing amount A2 can be readily adjusted to fall within a desired range.

Further, according to rotary cutting tool cutting insert 100 in the above-described embodiments, each of the width of third land surface 31 in the direction perpendicular to third line segment 30 and the width of fourth land surface 41 in the direction perpendicular to fourth line segment 40 may be larger than each of the width of first land surface 11 in the direction perpendicular to first line segment 10 and the width of second land surface 21 in the direction perpendicular to second line segment 20. Each of third line segment 30 and fourth line segment 40 corresponds to an outer peripheral edge. Each of first line segment 10 and second line segment 20 corresponds to a central edge.

In order to improve the swarf discharge performance, it is desirable that swarf 84 has a linearly extending shape. After scratching over the land surface, swarf 84 has a linearly extending shape. As the width of the land surface is larger, swarf 84 is more likely to have a linearly extending shape. Also, a relatively large width of the land surface increases the distance in which swarf 84 scratches the land surface, with the result that the cutting resistance increases. In order to suppress an increase in cutting resistance, it is desirable that the land surface has a relatively small width.

Since the outer peripheral edge is located on the outer peripheral side of rotation axis B, the centrifugal force applied to swarf 84 cut by the outer peripheral edge is relatively large. This increases the force by which swarf 84 penetrates into the inclined surface (third inclined surface 32 and fourth inclined surface 42). Thus, the width of the land surface (third land surface 31 and fourth land surface 41) needs to be large to some extent in order that swarf 84 cut by the outer peripheral edge has a linearly extending shape. On the other hand, since the central edge is located on the central side of rotation axis B, the centrifugal force applied to swarf 84 cut by the central edge is relatively small. This reduces the force by which swarf 84 penetrates into the inclined surface (first inclined surface 12 and second inclined surface 22). Accordingly, the width of the land surface (first land surface 11 and second land surface 21) does not need to be so large in order that swarf 84 cut by the central edge has a linearly extending shape.

The width of the land surface on the outer peripheral edge side is larger than the width of the land surface on the central edge side. Thereby, swarf 84 can be formed in a linearly extending shape while suppressing an increase in cutting resistance in each of the outer peripheral edge and the central edge.

Further, according to rotary cutting tool cutting insert 100 in the above-described embodiment, each of the radius of curvature of third curved portion 53 and the radius of curvature of fourth curved portion 54 may be twice or more and five times or less the radius of curvature of first curved portion 51, and may be twice or more and five times or less the radius of curvature of second curved portion 52. Thereby, in rotary cutting tool 200 having a practical tool diameter A1, central edge sharing amount A2 and the outer peripheral edge sharing amount can be set at approximately the same level. Thus, the cutting resistance can be reduced that occurs when cutting highly viscous workpiece 80 such as stainless steel. Further, the depth of a scratch on the side surface of hole 83 formed in workpiece 80 can be reduced.

EXAMPLES (Preparation of Samples)

The following describes a cutting test. In the cutting test, samples 1 to 7 each were used as cutting insert 100.

FIG. 16 is a diagram showing configurations of cutting inserts 100 of respective samples 1 to 7. As shown in FIG. 16, the radii of curvature (a first radius of curvature R1 and a second radius of curvature R2) of the acute angle-side curved portions were 0.6 mm in cutting inserts 100 of respective samples 1 to 7. The radii of curvature (third radius of curvature R3 and fourth radius of curvature R4) of the obtuse angle-side curved portions were 0.6 mm, 0.6 mm, 1.0 mm, 1.4 mm, 1.8 mm, 2.2 mm, and 1.4 mm in cutting inserts 100 of samples 1, 2, 3, 4, 5, 6, and 7, respectively.

The ratios of the radii of curvature of the obtuse angle-side curved portions to the radii of curvature of the acute angle-side curved portions were 1, 1, 1.67, 2.33, 3, 3.67, and 2.33 in cutting inserts 100 of samples 1, 2, 3, 4, 5, 6, and 7, respectively. The central edge sharing rates were 52.9%, 52.9%, 52.0%, 50.7%, 50.1%, 48.9%, and 50.7% in cutting inserts 100 of samples 1, 2, 3, 4, 5, 6, and 7, respectively. Top surface 1 of cutting insert 100 of sample 1 had a hump-shaped breaker 7 (see FIG. 13). Top surface 1 of cutting insert 100 of each of samples 2 to 6 had a flat shape (see FIG. 14). Top surface 1 of cutting insert 100 of sample 7 had a recessed shape (see FIG. 15).

(Cutting Test Conditions)

In the cutting test, hole 83 was formed in each of workpieces 80 using rotary cutting tools 200 equipped with cutting inserts 100 of respective samples 1 to 7. A machine tool used in the test was M/C BT50. Workpiece 80 used in the test was SUS 316L. The drill diameter (Dc) was set at 20 mm. The cutting speed (Vc) was set at 150 m/min. The feed rate (f) was set at 0.08 mm/rotation. The depth (L) of each hole was 60 mm. Wet processing (2 MPa) was employed for processing.

(Cutting Test Results)

<Shape of Swarf 84>

FIG. 17 shows photographs of swarf from workpieces 80 cut by cutting inserts 100 of respective samples 1 to 7. In FIG. 17, each of the photographs on the upper side shows entire swarf while each of the photographs on the lower side shows swarf in an enlarged manner. In FIG. 17, longer swarf was obtained by cutting off with the central edge, and shorter swarf was obtained by cutting off with the outer peripheral edge. As shown in FIG. 17, the swarf of workpiece 80 cut off by cutting insert 100 of sample 1 was greatly twisted and collapsed. Thus, a part of the swarf of workpiece 80 cut off by cutting insert 100 of sample 1 was jammed in swarf discharge groove 63 and not smoothly discharged. On the other hand, the swarf of workpiece 80 cut off by cutting insert 100 of each of samples 2 to 7 was substantially cylindrical and not greatly twisted. Accordingly, the swarf of workpiece 80 cut off by cutting insert 100 of each of samples 2 to 7 was smoothly discharged through swarf discharge grooves 63. Thereby, it was confirmed that cutting insert 100 in each of the first and second embodiments can be improved in performance for discharging the swarf of stainless steel.

<Cutting Resistance>

Figure 18:
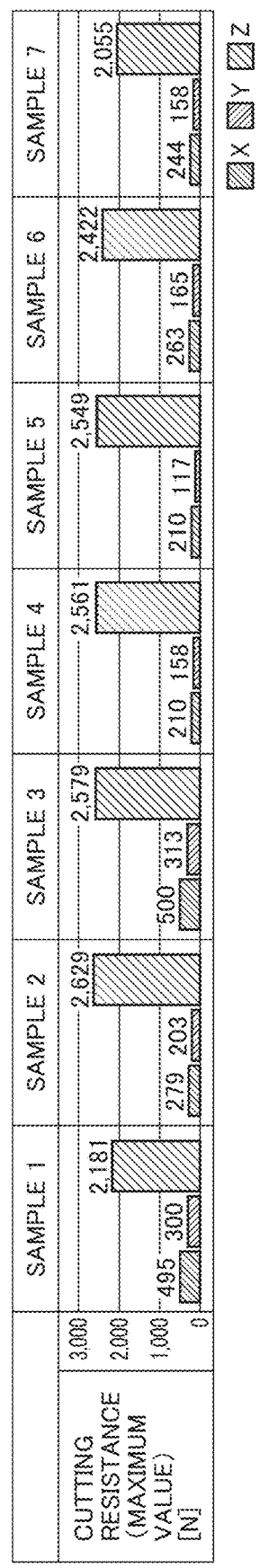
FIG. 18 is a diagram showing cutting resistances of the cutting inserts of respective samples 1 to 7.

FIG. 18 is a diagram showing cutting resistances of cutting inserts 100 of respective samples 1 to 7. In FIG. 18, Z is the maximum value of the cutting resistance in the direction along rotation axis B. X is the maximum value of the cutting resistance in the direction perpendicular to Z. Y is the maximum value of the cutting resistance in the direction perpendicular to each of X and Z. The maximum value of the cutting resistance in the Z direction was larger in the case of cutting insert 100 of sample 2 than in the case of cutting insert 100 of sample 1. The maximum value of the cutting resistance in each of the X direction and the Y direction was smaller in the case of cutting insert 100 of sample 2 than in the case of cutting insert 100 of sample 1.

The maximum value of the cutting resistance in the Z direction was the smallest in the case of cutting insert 100 of sample 7. Thus, it was confirmed that cutting insert 100 in the first embodiment could be reduced in cutting resistance in the Z direction. Among cutting inserts 100 of samples 2 to 6, cutting insert 100 of sample 6 showed the smallest cutting resistance in the Z direction. Thus, it was confirmed that the cutting resistance in the Z direction could be reduced by reducing the central edge sharing rate.

<Depth of Scratch on Side Surface of Hole>

Figure 19:
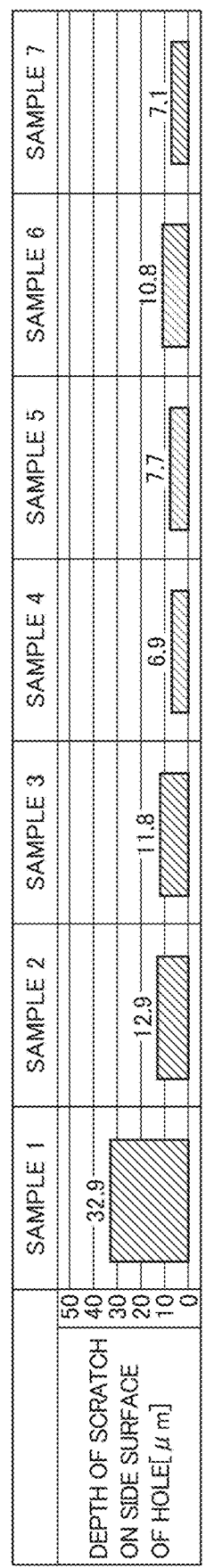
FIG. 19 is a diagram showing depths of scratches on side surfaces of holes formed by cutting inserts of respective samples 1 to 7.

After hole 83 was formed in workpiece 80, the depth of the scratch formed on the side surface of hole 83 was measured. FIG. 19 is a diagram showing depths of scratches on the side surfaces of the holes formed by cutting inserts 100 of respective samples 1 to 7. As shown in FIG. 19, the depth of the scratch on the side surface of hole 83 formed by cutting insert 100 of each of samples 2 to 7 was smaller than the depth of the scratch on the side surface of hole 83 formed by cutting insert 100 of sample 1. Thereby, it was confirmed that cutting insert 100 in each of the first and second embodiments could improve the quality of the hole. The depth of the scratch on the side surface of the hole was the smallest in the case of cutting insert 100 of sample 4.

It should be understood that the embodiments and examples disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

1 top surface, 2 bottom surface, 3 outer peripheral surface, 4 inner peripheral surface, 5 through hole, 6 cutting edge, 7 breaker, 10 first line segment, 11 first land surface, 12 first inclined surface, 20 second line segment, 21 second land surface, 22 second inclined surface, 30 third line segment, 31 third land surface, 32 third inclined surface, 40 fourth line segment, 41 fourth land surface, 42 fourth inclined surface, 50 flat portion, 51 first curved portion, 52 second curved portion, 53 third curved portion, 54 fourth curved portion, 60 main body portion, 61 front end surface, 62 outer peripheral side surface, 63 swarf discharge groove, 64 fitting portion, 65 rear end surface, 71 outer peripheral-side cutting insert placement groove, 72 central-side cutting insert placement groove, 73 attachment screw, 80 workpiece, 81 central edge cut area, 82 outer peripheral edge cut area, 83 hole, 84 swarf, 91 first intersection point, 92 second intersection point, 93 first outer peripheral point, 94 second outer peripheral point, 95 imaginary intersection point, 100 rotary cutting tool cutting insert (cutting insert), 200 rotary cutting tool, A1 tool diameter, A2 central edge sharing amount, A3 distance, B rotation axis, D1 first distance, D2 second distance, L1 first straight line, L2 second straight line, L3 third straight line, L4 fourth straight line, R1 first radius of curvature, R2 second radius of curvature, R3 third radius of curvature, R4 fourth radius of curvature, W1, W11 first land width, W2, W12 second land width, W3, W13 third land width, W4, W14 fourth land width.

The invention claimed is:

1. A rotary cutting tool cutting insert comprising:
   a top surface;
   a bottom surface located opposite to the top surface; and
   an outer peripheral surface contiguous to each of the top surface and the bottom surface, wherein
   a ridgeline between the top surface and the outer peripheral surface forms a cutting edge,
   the cutting edge includes
      a first line segment,
      a second line segment opposed to the first line segment,
      a third line segment inclined relative to each of the first line segment and the second line segment,
      a fourth line segment opposed to the third line segment,
      a first curved portion connecting the first line segment and the third line segment,
      a second curved portion connecting the second line segment and the fourth line segment,
      a third curved portion connecting the second line segment and the third line segment, and
      a fourth curved portion connecting the first line segment and the fourth line segment,
   a straight line along the first line segment and a straight line along the third line segment form an acute angle,
   a straight line along the second line segment and a straight line along the fourth line segment form an acute angle,
   the straight line along the second line segment and the straight line along the third line segment form an obtuse angle,
   the straight line along the first line segment and the straight line along the fourth line segment form an obtuse angle,
   each of the third curved portion and the fourth curved portion is larger in radius of curvature than the first curved portion and larger in radius of curvature than the second curved portion,
   the top surface has a flat portion spaced apart from the cutting edge,
   in the direction perpendicular to the bottom surface, the flat portion is located between the cutting edge and the bottom surface, and
   an entirety of the top surface is not located above the cutting edge in the direction perpendicular to the bottom surface when a direction from the bottom surface toward the top surface corresponds to an upward direction.

2. The rotary cutting tool cutting insert according to claim 1, wherein the top surface includes
   a first land surface contiguous to the first line segment, a second land surface contiguous to the second line segment,
a third land surface contiguous to the third line segment, and
a fourth land surface contiguous to the fourth line segment, and
each of a width of the third land surface in a direction perpendicular to the third line segment and a width of the fourth land surface in a direction perpendicular to the fourth line segment is larger than a width of the first land surface in a direction perpendicular to the first line segment and larger than a width of the second land surface in a direction perpendicular to the second line segment.

3. The rotary cutting tool cutting insert according to claim 1, wherein each of the radius of curvature of the third curved portion and the radius of curvature of the fourth curved portion is twice or more and five times or less the radius of curvature of the first curved portion, and is twice or more and five times or less the radius of curvature of the second curved portion.

4. The rotary cutting tool cutting insert according to claim 1, wherein the top surface includes
a first land surface contiguous to the first line segment,
a second land surface contiguous to the second line segment,
a third land surface contiguous to the third line segment, and
a fourth land surface contiguous to the fourth line segment,
each of a width of the third land surface in a direction perpendicular to the third line segment and a width of the fourth land surface in a direction perpendicular to the fourth line segment is larger than a width of the first land surface in a direction perpendicular to the first line segment and larger than a width of the second land surface in a direction perpendicular to the second line segment, and
each of the radius of curvature of the third curved portion and the radius of curvature of the fourth curved portion is twice or more and five times or less the radius of curvature of the first curved portion, and is twice or more and five times or less the radius of curvature of the second curved portion.

5. A rotary cutting tool comprising:
a rotary cutting tool cutting insert; and
a main body portion that holds the rotary cutting tool cutting insert, wherein the rotary cutting tool cutting insert includes
a top surface,
a bottom surface located opposite to the top surface, and
an outer peripheral surface contiguous to each of the top surface and the bottom surface, wherein
a ridgeline between the top surface and the outer peripheral surface forms a cutting edge,
the cutting edge includes
a first line segment,
a second line segment opposed to the first line segment,
a third line segment inclined relative to each of the first line segment and the second line segment,
a fourth line segment opposed to the third line segment,
a first curved portion connecting the first line segment and the third line segment,
a second curved portion connecting the second line segment and the fourth line segment,
a third curved portion connecting the second line segment and the third line segment, and
a fourth curved portion connecting the first line segment and the fourth line segment,
a straight line along the first line segment and a straight line along the third line segment form an acute angle,
a straight line along the second line segment and a straight line along the fourth line segment form an acute angle,
the straight line along the second line segment and the straight line along the third line segment form an obtuse angle,
the straight line along the first line segment and the straight line along the fourth line segment form an obtuse angle,
each of the third curved portion and the fourth curved portion is larger in radius of curvature than the first curved portion and larger in radius of curvature than the second curved portion,
the top surface has a flat portion spaced apart from the cutting edge,
in the direction perpendicular to the bottom surface, the flat portion is located between the cutting edge and the bottom surface,
an entirety of the top surface is not located above the cutting edge in the direction perpendicular to the bottom surface when a direction from the bottom surface toward the top surface corresponds to an upward direction.

6. The rotary cutting tool according to claim 5, wherein the top surface includes
a first land surface contiguous to the first line segment,
a second land surface contiguous to the second line segment,
a third land surface contiguous to the third line segment, and
a fourth land surface contiguous to the fourth line segment, and
each of a width of the third land surface in a direction perpendicular to the third line segment and a width of the fourth land surface in a direction perpendicular to the fourth line segment is larger than a width of the first land surface in a direction perpendicular to the first line segment and larger than a width of the second land surface in a direction perpendicular to the second line segment.

7. The rotary cutting tool according to claim 5, wherein each of the radius of curvature of the third curved portion and the radius of curvature of the fourth curved portion is twice or more and five times or less the radius of curvature of the first curved portion, and is twice or more and five times or less the radius of curvature of the second curved portion.

8. The rotary cutting tool according to claim 5, wherein the top surface includes
a first land surface contiguous to the first line segment,
a second land surface contiguous to the second line segment,
a third land surface contiguous to the third line segment, and
a fourth land surface contiguous to the fourth line segment,
each of a width of the third land surface in a direction perpendicular to the third line segment and a width of the fourth land surface in a direction perpendicular to the fourth line segment is larger than a width of the first land surface in a direction perpendicular to the first line segment and larger than a width of the second land surface in a direction perpendicular to the second line segment, and each of the radius of curvature of the third curved portion and the radius of curvature of the fourth curved portion is twice or more and five times or less the radius of curvature of the first curved portion, and is twice or more and five times or less the radius of curvature of the second curved portion.

9. A rotary cutting tool cutting insert comprising:
a top surface;
a bottom surface located opposite to the top surface; and
an outer peripheral surface contiguous to each of the top surface and the bottom surface, wherein
a through hole is opened at each of the top surface and the bottom surface,
a ridgeline between the top surface and the outer peripheral surface forms a cutting edge,
the cutting edge includes
   a first line segment,
   a second line segment opposed to the first line segment,
   a third line segment inclined relative to each of the first line segment and the second line segment,
   a fourth line segment opposed to the third line segment,
   a first curved portion connecting the first line segment and the third line segment,
   a second curved portion connecting the second line segment and the fourth line segment,
   a third curved portion connecting the second line segment and the third line segment, and
   a fourth curved portion connecting the first line segment and the fourth line segment,
a straight line along the first line segment and a straight line along the third line segment form an acute angle,
a straight line along the second line segment and a straight line along the fourth line segment form an acute angle,
the straight line along the second line segment and the straight line along the third line segment form an obtuse angle,
the straight line along the first line segment and the straight line along the fourth line segment form an obtuse angle,
each of the third curved portion and the fourth curved portion is larger in radius of curvature than the first curved portion and larger in radius of curvature than the second curved portion, and
in a direction perpendicular to the bottom surface, a distance between the top surface and the bottom surface is equal to a distance between the cutting edge, and the bottom surface,
wherein the top surface includes
a first land surface contiguous to the first line segment,
a second land surface contiguous to the second line segment,
a third land surface contiguous to the third line segment, and
a fourth land surface contiguous to the fourth line segment, and
in a cross section perpendicular to the bottom surface and located at a center of the through hole, each of a width of the third land surface in a direction perpendicular to the third line segment and a width of the fourth land surface in a direction perpendicular to the fourth line segment is larger than a width of the first land surface in a direction perpendicular to the first line segment and larger than a width of the second land surface in a direction perpendicular to the second line segment.

10. The rotary cutting tool cutting insert according to claim 9, wherein a distance between opposed surfaces of the outer peripheral surface in a direction parallel to the bottom surface continuously decreases from the top surface toward the bottom surface.

11. The rotary cutting tool cutting insert according to claim 9, wherein each of the width of the third land surface in the direction perpendicular to the third line segment and the width of the fourth land surface in the direction perpendicular to the fourth line segment is twice or more the width of the first land surface in the direction perpendicular to the first line segment and twice or more the width of the second land surface in the direction perpendicular to the second line segment.

12. The rotary cutting tool cutting insert according to claim 9, wherein each of the radius of curvature of the third curved portion and the radius of curvature of the fourth curved portion is twice or more and five times or less the radius of curvature of the first curved portion, and is twice or more and five times or less the radius of curvature of the second curved portion.

13. A rotary cutting tool comprising:
the rotary cutting tool cutting insert according to claim 9; and
a main body portion that holds the rotary cutting tool cutting insert.

* * * * *